(12) United States Patent  
Gershman

(10) Patent No.: US 7,088,880 B1
(45) Date of Patent: Aug. 8, 2006

(54) OPTICAL FIBER COUPLING AND INLINE FAULT MONITOR DEVICE AND METHOD

(75) Inventor: Vladimir Gershman, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 196 days.

(21) Appl. No.: 10/746,302

(22) Filed: Dec. 24, 2003

(51) Int. Cl.
*G02B 6/26* (2006.01)
*G02B 6/42* (2006.01)

(52) U.S. Cl. .......................... 385/12; 385/52
(58) Field of Classification Search ............... 385/12, 385/52
See application file for complete search history.

(56) References Cited

U.S. PATENT DOCUMENTS

| | | | |
|---|---|---|---|
| 4,837,856 A | 6/1989 | Glista, Jr. ............... 455/601 |
| 5,146,527 A * | 9/1992 | Mallinson ................ 385/98 |
| 5,177,808 A * | 1/1993 | Satake et al. ............ 385/98 |
| 5,653,897 A * | 8/1997 | Findlan et al. ......... 219/121.63 |
| 5,758,000 A * | 5/1998 | Zheng ................... 385/97 |
| 5,793,481 A | 8/1998 | Leali ..................... 356/73.1 |
| 6,097,426 A * | 8/2000 | Esmaeili ................ 348/90 |
| 6,243,510 B1 | 6/2001 | Rauch ................... 385/15 |
| 2002/0159724 A1* | 10/2002 | Oki et al. ............... 385/97 |
| 2002/0197027 A1* | 12/2002 | Saito et al. ............. 385/96 |
| 2003/0002827 A1* | 1/2003 | Ozawa et al. ........... 385/96 |
| 2003/0108307 A1* | 6/2003 | Eskildsen et al. ...... 385/96 |
| 2005/0117856 A1* | 6/2005 | Huang et al. ........... 385/96 |

OTHER PUBLICATIONS

Palais, Joseph C., *Fiber Optic Communications*, 1984, ISBN 0-13-314527-1.

* cited by examiner

*Primary Examiner*—Frank G. Font
*Assistant Examiner*—James P. Hughes
(74) *Attorney, Agent, or Firm*—Duane Morris LLP

(57) ABSTRACT

An optical fiber connection arrangement includes an alignment sleeve for coaxially aligning optical fibers mounted in ferrules. A gap between the ends of the optical fibers allows some light to escape. A sensor responds to the leaked light, and the resulting signal is processed to determine whether light signal is present or absent.

23 Claims, 6 Drawing Sheets

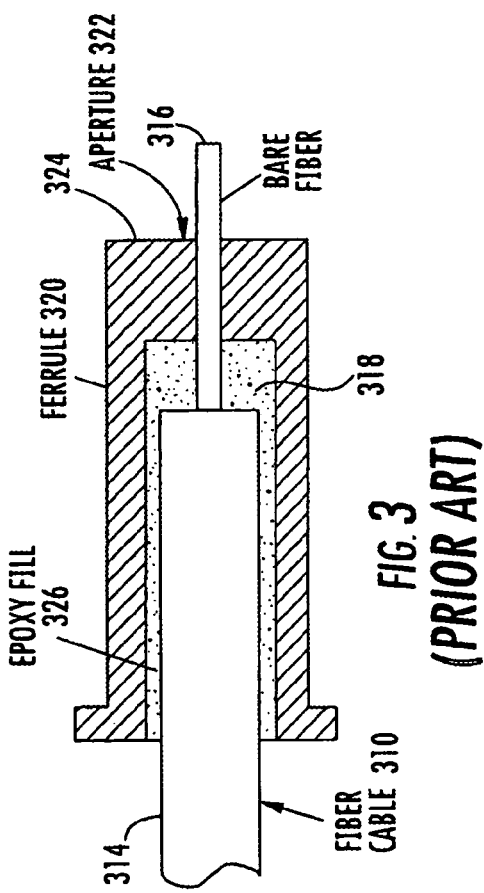
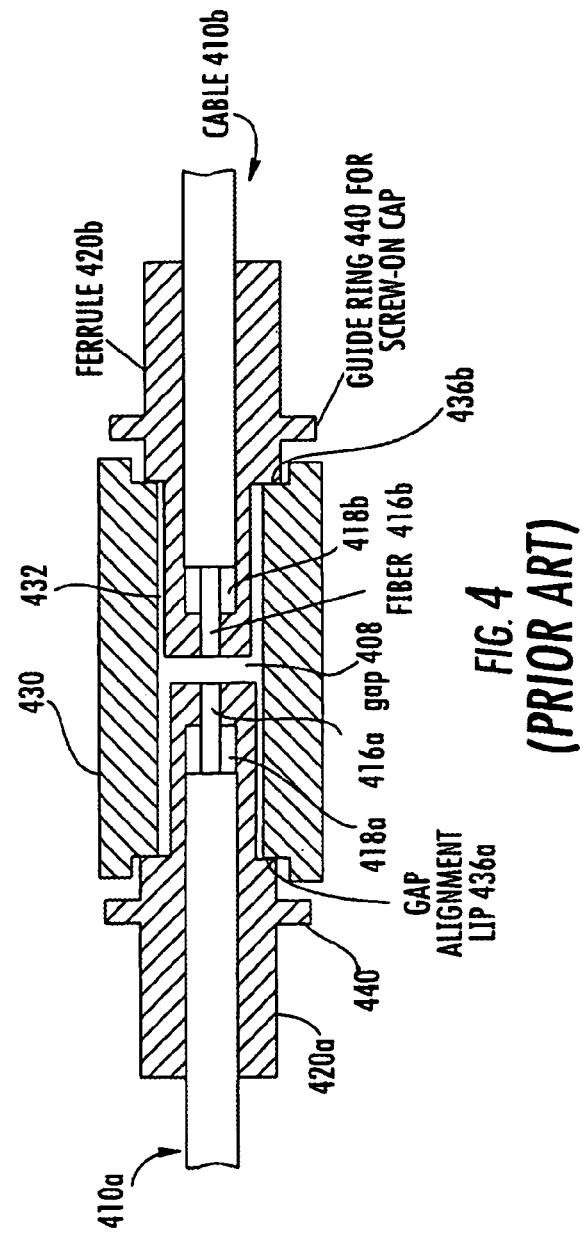

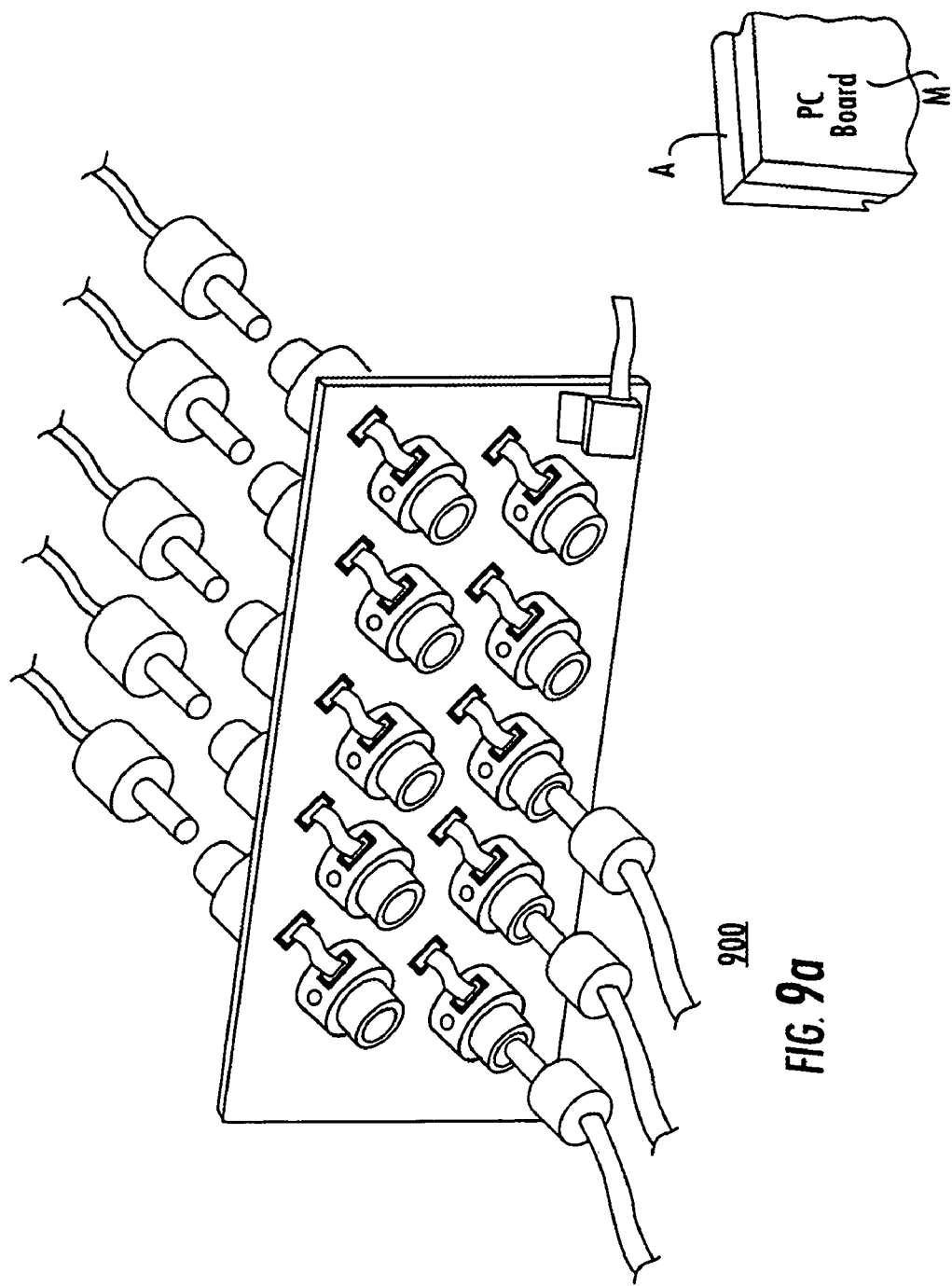

OPTICAL FIBER COUPLING AND INLINE FAULT MONITOR DEVICE AND METHOD

FIELD OF THE INVENTION

This invention relates to sensors for use in conjunction with optical fiber systems, for aiding in monitoring and verification of signal flow.

BACKGROUND OF THE INVENTION

Many communication systems rely on optical fibers for carrying signals, because of the very high bandwidth of optical fibers. In complex systems, it may be desirable to be able to route signals on a particular optical fiber to a given one of a plurality of sources or sinks of optical signals. This could be the case, for example, in a shipboard environment in which communications are accomplished by means of such optical fibers, and the optical fibers themselves, and the sources and sinks of information, are subject to damage due to collision or hostile action. In such an event, it is desirable to be able to disconnect an optical fiber from a failed unit and to reconnect it to an operable unit of the same (or possibly of a different) type.

FIG. 1 represents a prior-art arrangement 10 for routing optical communications fibers among a plurality of sources and sinks of information. In FIG. 1, a first source, sink, or source/sink of optical signals is represented as a box or block 12, and a second source, sink, or source/sink of such signals is represented as a box 14. Similarly, boxes 16 and 18 represent sources/sinks of a particular type of optical communications signals. As illustrated in FIG. 1, an optical fiber 12o carries signals produced by block 12 to a through connector in the form of a bulkhead junction or bulkhead connector 20a of a patch panel 20, and thence through another optical fiber 14o to optical signal source/sink 14. Similarly, optical signals produced by source 18 are carried by an optical fiber 18o to a bulkhead junction or bulkhead connector 20b, and thence by way of an optical fiber 16o to source/sink block 16. Other optical fibers, illustrated together as a bundle 22, extend from various junction connectors, such as exemplary junction connectors 20c, 20d, 20f, and 20g, through a bulkhead holder or wall 24 aperture 26, where they connect to various sources and sinks of optical signal (not illustrated). Junction connectors 20c, 20d, 20f, and 20g connect to various optical fibers 28c, 28d, 28f, and 28g, illustrated together as a bundle 28, which leave the region to connect to various sources and sinks of optical signals.

It will be clear by considering FIG. 1 that the various equipments 12, 14, 16, and 18, as well as the remote equipments, can be connected together in various ways to either bypass damaged or defective equipment, or to apply signals to various different types of processing as may be required or desired, simply by disconnecting a fiber from a junction or patch terminal of patch panel 20, and reconnecting it by way of another junction or patch terminal which communicates with the desired functional block. This ready reconfiguration may be valuable in various contexts.

A disadvantage of the patch-panel routing suggested by FIG. 1 is that troubleshooting is somewhat difficult, in that a problem is usually manifested as a failure of a system including at least a source of optical signals and a sink of optical signals, joined by at least two separate optical fibers and a junction connector. When a failure of such a system is suspected, it is initially not known whether the problem lies in the source, the sink, or the interconnecting optical fibers.

The troubleshooting of such arrangements may be done in a multitude of ways. One possible way to troubleshoot a failed system is to divide it into two parts, by disconnecting one of the optical fibers at the bulkhead connector of the junction panel. For example, if the putatively failed system includes source or source/sink 12 and sink or source/sink 14 of FIG. 1, some information could be gleaned by separating optical fiber 14o from bulkhead connector 20a, and placing a light-responsive meter on bulkhead connector 20a. If source 12 is operating, and produces enough light to be displayed on an optical power meter, one may make an initial assumption that source 12 and optical fiber 12o are functional, and the system problem lies elsewhere. If the operating mode of source 12 is not readily controllable, and no light is perceived at bulkhead connector 20a, it may be necessary to disconnect optical fiber 12o from optical source 12, and to substitute a known test light source. With a test light source at the remote end of optical fiber 12o, and an optically responsive meter attached to bulkhead connector 20a, the state of optical fiber 12o can be established without question. Testing of optical fiber path 14o may involve disconnecting optical fiber 14o from bulkhead connector 20a, and applying a light source to the remote side (not visible in FIG. 1) of bulkhead connector 20a, and disconnecting the connection of optical fiber 14o from equipment 14, and placing an optically responsive meter at the near end of fiber 14o.

While the described testing is tedious but reasonably efficient, the difficulties become greater when the equipments to which the optical fibers are connected lie at remote locations relative to the patch panel 20 of FIG. 1. This would be the case if equipments connected and interacting through optical fiber bundle 22, one or more of bulkhead connectors 20c, 20d, 20e, and or 20f, and optical fiber bundle 28, were to cease to function correctly. In that case, testing would require traveling to at least one of the remote locations to break a connection, and another trip to reestablish the connection. In addition, either the connections and tests would have to be performed seriatim by one person, or the connection/disconnection would have to be coordinated by some form of communications other than the optical fiber in question. In complex systems with hundreds of optical fibers, the testing may result in long down times.

Prior methods for addressing the problems of testing of complex communication systems take forms such as repeater junction boxes, as described in U.S. Pat. No. 6,243,510, issued Jun. 5, 2001 in the name of Rauch, and automatic analysis systems such as that described in U.S. Pat. No. 4,837,856 issued Jun. 6, 1989 in the name of Glista, Jr. In general, the repeater or junction boxes have relatively limited bandwidth, and are complex and expensive, and the automatic analysis arrangements are complex and expensive. The automatic analysis system uses a bypass fiber, and its manufacturing is complex. Another arrangement is described in U.S. Pat. No. 5,793,481, issued Aug. 11, 1998 in the name of Leali, which samples the signals at a location using a splitter/bypass, and processes them to produce an indication of the presence or absence of signals, which is complex.

Improved or alternative arrangements optical fiber status indicators or sensors are desired.

SUMMARY OF THE INVENTION

A sensor according to an aspect of the invention, for use in conjunction with light flow through a junction or gap between first and second optical fibers, comprises an alignment sleeve including first and second ends. The first and second ends of the alignment sleeve are dimensioned to accommodate ends of first and second optical fiber ferrules, respectively. The alignment sleeve, when assembled with the ferrules, coaxially aligns the associated first and second optical fibers, respectively, to thereby facilitate the flow of light across a gap between the first and second optical fibers. The sensor includes an optical sensor located adjacent the gap, for generating an electrical signal representative of light leaking from the gap. An indication arrangement is responsive to the electrical signal for providing an indication of light flow through the gap.

In a particular embodiment of the invention, the indication arrangement comprises a visual indicator, which may be a light-emitting solid-state device. In another particular embodiment, the indicator may be a digital electrical network interface, or may include both. In the case of a digital electrical network interface, the indication means may include a serial data bus interface, which may be an Inter-Integrated Circuit ($I^2C$) bus connection.

A system according to another aspect of the invention is for monitoring light flow through plural junctions between pairs or sets of optical fibers. Each of the sets of optical fibers includes first and second optical fibers. The system comprises a plurality of sensors, each of which comprises (a) an alignment sleeve including first and second ends, with the first and second ends of the alignment sleeve being dimensioned to accommodate ends of first and second optical fiber ferrules. The alignment sleeve, when assembled with the ferrules, coaxially align the associated first and second optical fibers, respectively, of one of the plural sets of optical fibers, to thereby facilitate the flow of light across a gap between the first and second optical fibers of the one of the sets of optical fibers. The system also includes (b) an optical sensor located adjacent the gap, for generating an electrical signal representative of light leaking from the gap, (c) an address generator for generating a unique address for each of the sensors, (d) a bus connection arrangement responsive to the electrical signal and to the address, for generating a bus signal including information relating to the light flow through the gap and the identity of the sensor, and (e) a bus coupled to the bus connection means of each of the sensors and to utilization means. In a particular embodiment of this aspect of the invention, the bus connection arrangement generates the bus signal according to a first bus protocol, and the system further includes protocol conversion means coupled to the bus, for converting the first bus protocol to a second bus protocol.

BRIEF DESCRIPTION OF THE DRAWING

FIG. 3 is a simplified cross-sectional view of a partially completed optical fiber mounted in a ferrule;

FIG. 4 is a simplified cross-section of the juxtaposition of two optical fibers, each mounted in a ferrule, with the aid of an alignment sleeve;

FIG. 9a is a simplified perspective or isometric view, partially exploded, showing a patch panel using fault-detection/optical-fiber-couplings in a network context, and FIG. 9b is a simplified perspective or isometric view of a portion thereof.

DESCRIPTION OF THE INVENTION

Figure 1:
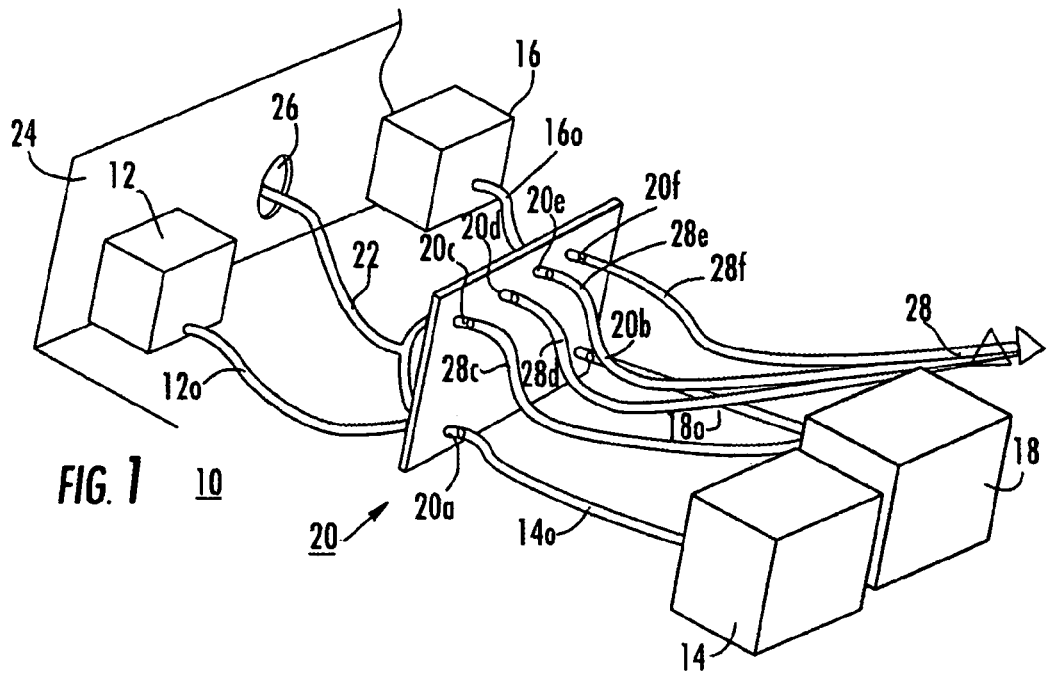
FIG. 1 is a simplified diagram in perspective or isometric view of a prior-art optical fiber connection system, illustrating a patch panel.
Figure 2A:
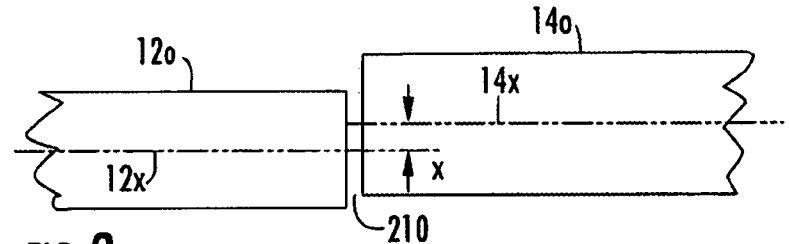
FIG. 2a is a simplified representation of the juxtaposition of the ends of two optical fibers, illustrating transverse misalignment of the axes.
Figure 2B:
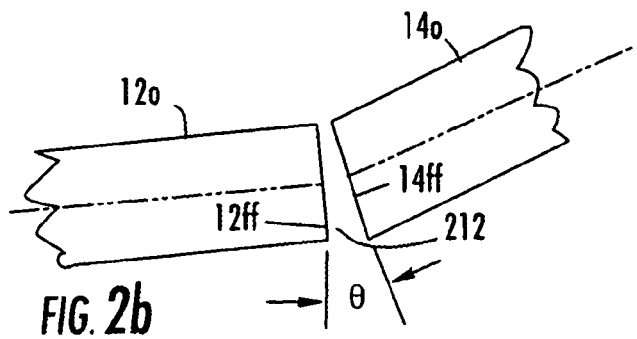
FIG. 2b is a simplified representation similar to that of FIG. 2a, illustrating skew misalignment.

One way optical fibers are connected is by butting together flat end faces of the optical fibers. FIGS. 2a and 2b illustrate two possible types of optical fiber misalignment, as described at page 154 in the text FIBER OPTICS AND OPTOELECTRONICS, second edition, by Peter K. Cheo, published 1990 by Prentice-Hall, ISBN 0-13-315045-3. In FIG. 2a, the axis 12x of optical fiber 12o is offset by a distance x from the axis 14x of optical fiber 14o, so the gap 210 between the ends of the fibers has constant thickness or spacing. In FIG. 2b, the front faces 12ff and 14ff of optical fibers 12a and 14a, respectively, are skewed by an angle designated Θ to create a gap 212 of varying width.

The skewing or offset of the two fibers as described in conjunction with FIGS. 2a and 2b tends to cause some of the light traveling through the gap between the leak, so that the receiving optical fiber receives less light than might otherwise be expected. Also, some of the light arriving at the gap from a fiber may be reflected by the gap, and return through the fiber toward the source of the light. Both reflection and leakage cause attenuation of the signal coupled from one fiber to another through a gap between fibers. A conventional solution to these potential misalignments and losses is described in the text FIBER OPTIC COMMUNICATIONS, second edition, by Joseph C. Palais, published 1984, 1988 by Prentice-Hall, ISBN 0-13-314527-1. Attachment of an optical fiber to a ferrule is described therein. FIG. 3 represents the attachment of an optical fiber to a ferrule in the manner described by Palais. In FIG. 3, an optical fiber cable 310 including a cover 314 and an optical fiber proper 316 is inserted into an axial bore 318 in a ferrule 320, with the bare optical fiber 316 extending through an aperture 322 in a front face 324 of the ferrule 320. Cavity 318 between the optical fiber cover 314 and the inner surface of cavity 318 of the ferrule 324 is filled with epoxy 326. The bare fiber 316 extending from front face 324 is broken off or removed, and the front face 324, with the optical fiber, is polished flat. Two optical fibers can be juxtaposed with their front faces 324 adjoining to allow light to flow between the fibers, but this is still subject to attenuation attributable to the misalignments described in conjunction with FIGS. 2a and 2b.

FIG. 4 illustrates the juxtaposition (butting) of two optical fiber cables 410a and 410b, each mounted in a ferrule 420a and 420b, respectively, as described in conjunction with FIG. 3. An alignment sleeve 430 defines a through aperture 432 with first and second open ends 434a and 434b, into which ferrules 420a and 420b, respectively, are inserted. A gap alignment lip 436a, 436b associated with the alignment sleeve 430 provides an abutment surface or stop against which corresponding surfaces of ferrules 420a, 420b, respectively, can be placed. The positions of the alignment lips on the ferrules and the alignment sleeve are selected so that the adjacent ends of optical fibers 416a and 416b are separated by a gap 408 of known dimension. The alignment sleeve 430 holds coaxial the ferrules 420a and 420b, and the associated ends of the optical fibers 416a, 416b, to thereby tend to minimize the misalignments described in conjunction with FIGS. 2a and 2b. The alignment sleeve and associated ferrules may have any sort of gap alignment lip. The alignment sleeve may be threaded or unthreaded, and if threaded, the associated ferrules may include a guide ring 440 for a screw-on cap.

Figure 5:
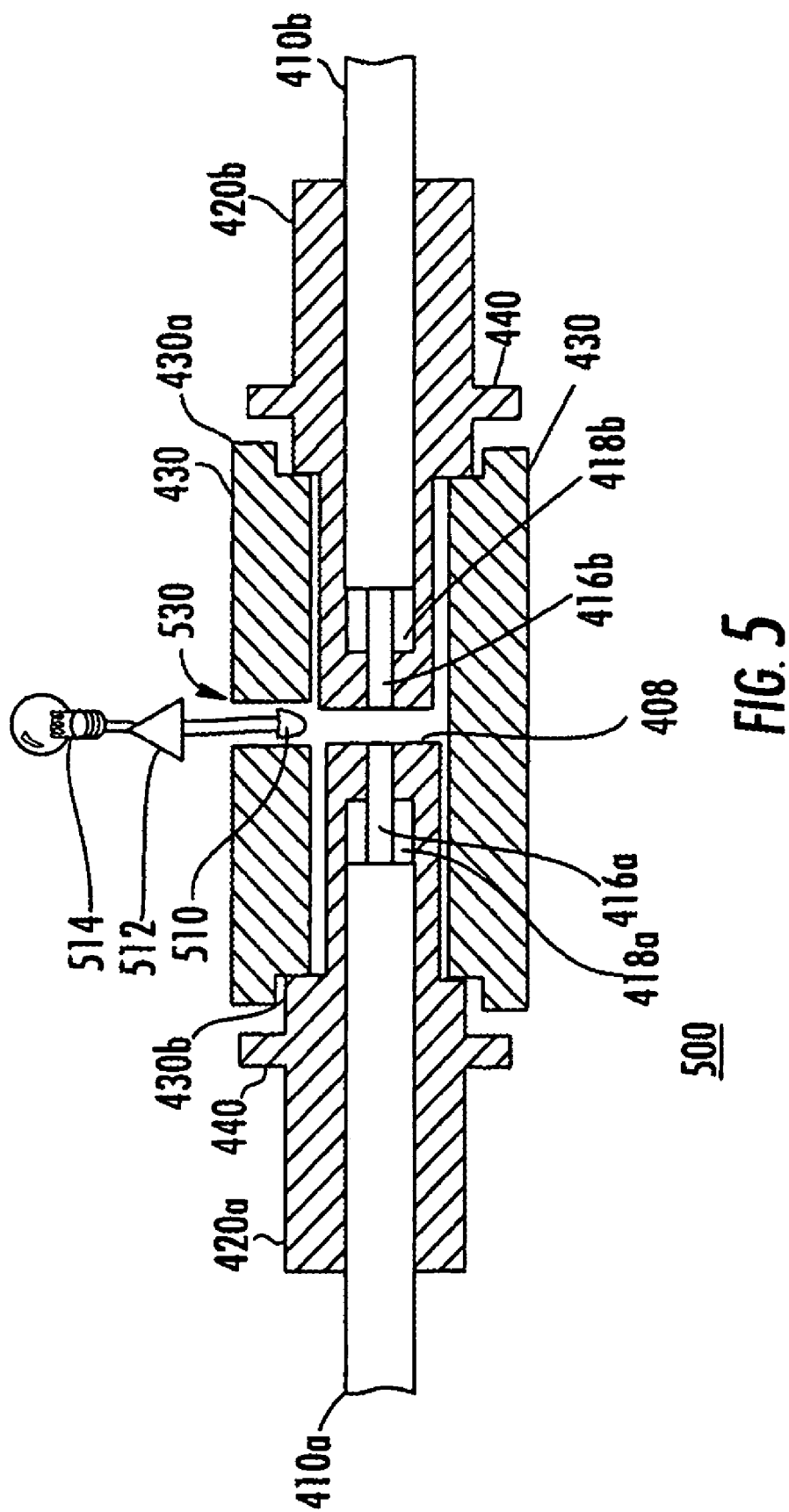
FIG. 5 is a simplified cross-section similar to that of FIG. 4, illustrating a light sensor arrangement extending into the region near the gap between the optical fibers in the alignment sleeve.

According to an aspect of the invention, the light leaking from the gap 408 of FIG. 4 is sensed to produce an indication of the light flowing through the optical fibers 416a and 416b. The resulting structure performs much the same function as the directional or star coupler arrangement of the Leali patent, but is much less complex and expensive. FIG. 5 is a cross-sectional view similar to that of FIG. 4, illustrating the principle of the invention. In FIG. 5, elements corresponding to those of FIG. 4 are designated by like alphanumerics. The arrangement of FIG. 5 differs from that of FIG. 4, in that the alignment sleeve 430 defines an aperture 530 extending through one side at a location aligned with the gap 408. A light-responsive sensor 510 is inserted into this aperture 530, so as to receive light leaked from gap 408 when light is traversing the optical junction between the two optical fibers. Light-responsive sensor 510 produces an electrical signal which is applied to an indicator arrangement illustrated as an amplifier 512 and a light emitting device 514, represented as a light bulb. Those skilled in the art know that solid-state light emitters are preferred to ordinary light bulbs because of their efficiency and long life. Other forms of indicators may be used. Preferred indicators include solid-state devices such as light emitting diodes (LEDs).

It will be apparent that the arrangement described in conjunction with FIG. 5 amounts to an inline fault detector for optical fibers. The amount of light or the light power passing between the optical fibers must be of a magnitude such that the leaked light is sufficient to cause the light sensor 510 to produce a signal. Thus, there is a tradeoff between the requisite amount of leakage light at the gap and the sensitivity of the light responsive sensor. A more sensitive sensor allows inline fault detection with less light traversing the fibers or with a lower-loss gap, or both. Those skilled in the art know how to handle this tradeoff. As described in the literature, a gap such as 408 is not too critical for power loss.

A major advantage of an aspect of the invention over arrangements which detect the light to produce an electrical signal, perform the fault detection, and then remodulate the light for transmission further down the fiber, is that of bandwidth. The presence of a demodulator/remodulator in a signal transmission path can significantly limit the effective bandwidth of the transmission path, whereas according to aspects of the invention the optical fibers are coupled as directly as possible, without demodulation or remodulation of the signals traversing the signal path.

Figure 6:
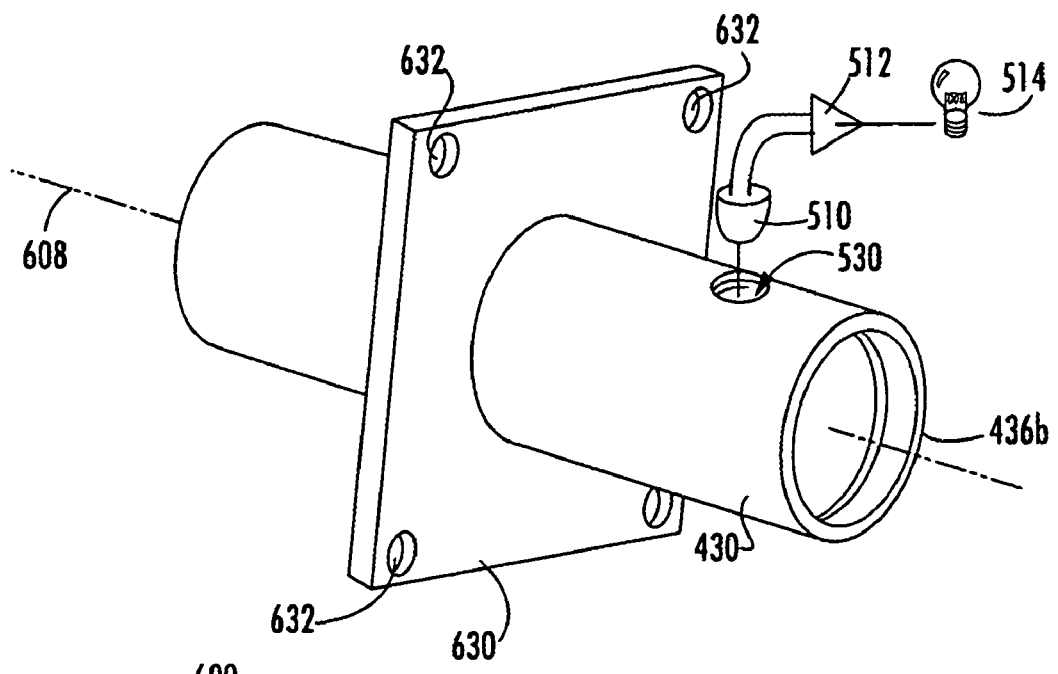
FIG. 6 is a simplified perspective or isometric view, partially exploded to show details, of a fault-detection/ optical-fiber-coupling which can be used as a bulkhead connector.

FIG. 6 illustrates a structure 600 including an alignment sleeve similar to that of FIG. 5, fitted with a flange to provide facility for bulkhead mounting. In FIG. 6, elements corresponding to those of FIG. 5 are designated by the same alphanumerics. The alignment sleeve is designated 430, and the alignment lip as 436b. A mounting flange 630 is affixed or integral with alignment sleeve 430, and projects in a plane orthogonal to alignment axis 608. Flange 630 defines a plurality of screw clearance apertures, some of which are designated 632, by which the flange can be affixed to a bulkhead panel through which a portion of the alignment sleeve 430 projects. Thus, the inline fault detector can be a combination bulkhead connector/fault detector.

Figure 7:
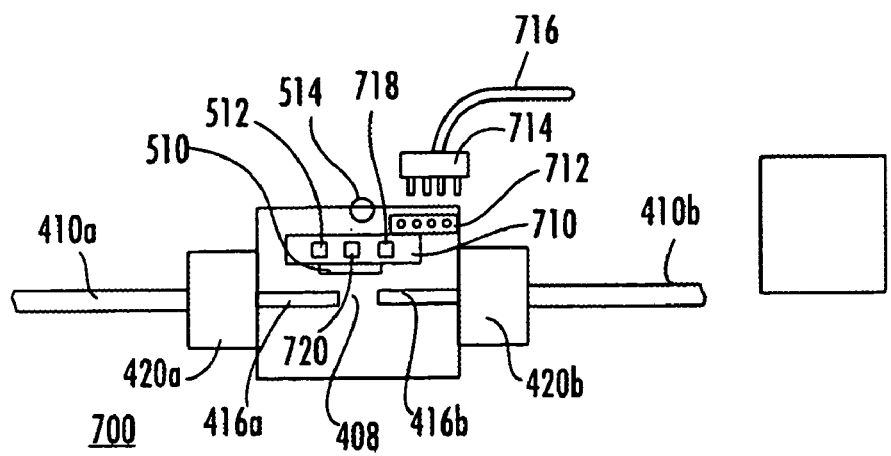
FIG. 7 is a simplified representation of a fault-detection/ optical-fiber-connector, illustrating details of a possible placement of microchips on a printed circuit board.

FIG. 7 is a symbolic representation of an inline fault detector, showing the use of both a local indicator and a network connection. In FIG. 7, elements corresponding to those of FIG. 5 are designated by like reference alphanumerics. As illustrated in FIG. 7, the light sensing device 510 may be mounted on a printed-circuit board 710 at a location adjacent gap 408. A light-emitting diode 514 provides local indication, and 512 is the amplifier. A multicontact connector 712 provides for interconnection with a mating connector 714 and associated cable 716, which includes signal conductors as well as conductors for providing power to the printed circuit board 710 and its associated electrical/electronic elements.

The arrangement of FIG. 7 also includes a chip or solid-state network processor 718 which interacts with a unique address generator 720 and with sensor 510 to communicate through cable 716 with an external network. The unique address generator produces an address which allows the location of a fault to be localized. The sensor 510 information is processed by processor 718 and reported to the network. In one embodiment of the invention, the cable 716 uses four conductors, namely a common, a power conductor to carry operating power from the remote network to the device 700, and two more conductors for I²C data and clock signals.

Figure 8:
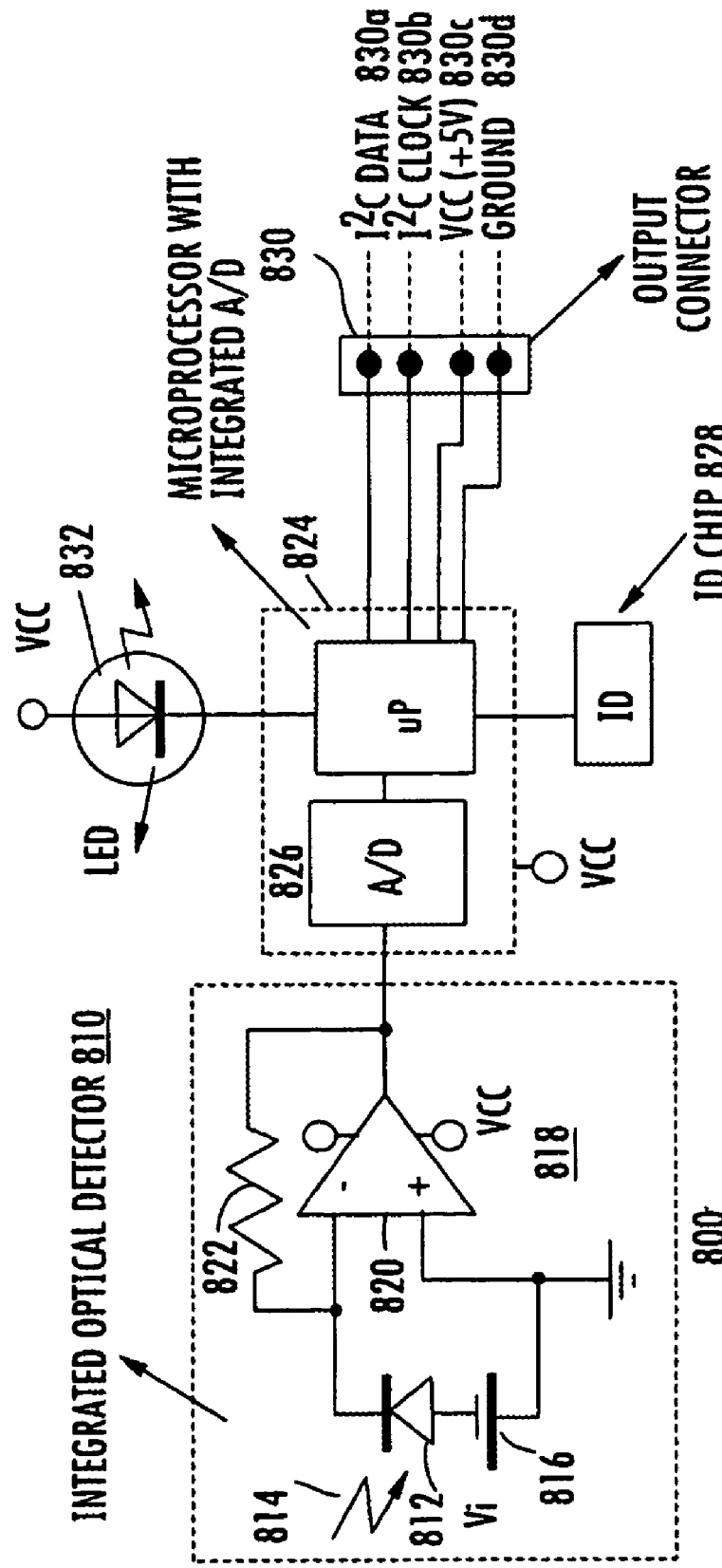
FIG. 8 is a simplified diagram in schematic and block form, illustrating a possible electrical/electronic layout.

FIG. 8 is a simplified schematic and block diagram illustrating details of one possible embodiment 800 of the electronics of the invention. In FIG. 8, an integrated optical detector 810 includes a sensor 812 responsive to light 814 for producing an electrical indication. A bias voltage source 816 provides operating bias. The electrical indication, together with the bias, is applied to the terminals of a feedback 822 amplifier 818 to produce an analog signal related to the amplitude of the leakage light 814 reaching the sensor 812. The analog signal is applied from the output of the amplifier 818 to a microprocessor (μP) 824 incorporating an integral 8-bit analog-to-digital converter (ADC) 826 for converting the analog output signal from amplifier 818 into digital form which can be processed by μP 824. Processor 824 processes the local identification or address signal from an ID chip 828, together with the light-power-representative digital signal, to produce I²C-format digital data signals for transmission over a conductor 830a associated with terminal or connector strip 830. Clock signals are coupled between μP 824 and conductor 830b. Power for operating the various components of structure 800 of FIG. 8 is provided by a VCC conductor 830c and ground conductor 830d. A light-emitting diode (LED) 832 is connected to μP 824.

In operation of structure 800 of FIG. 8, the amount of optical leakage power 814 detected by the optical detector 812 is converted to analog electric voltage (or possibly a current), which is digitized in ADC 826. The digital signal is then processed, and controls the indicator LED, and also controls network transmission of the I²C-format (or any other desired format) digital data signals. If the amount of light power corresponds to one consistent with normal light transmission through the optical fibers, the LED will be ON or lit, and exhibit a green color, otherwise the LED will be OFF or dark. If the LED is of the dual-color type, it will turn red rather than OFF. The data stream constantly transmits the measured power level, together with the ID of the inline sensor. A central computer can monitor the power level, and use calibration to identify those power levels which can be considered to represent ordinary operation and fault conditions.

In operation of the arrangement of FIG. 8, microprocessor 824 generates one static signal for controlling the LED 832, and also produces two dynamic signals, which are the clock and data signals, in this cased corresponding to the standard two-wire I²C bus. Microprocessor 824 compares the light power as indicated by the optical detector 810 with a standard, and produces the required LED control signals. All the elements of the arrangement of FIG. 8 are commercial off-the-shelf (COTS) items. The microprocessor may contain internal FLASH (nonvolatile) memory to store calibration data, or use external FLASH memory.

The described inline detector arrangement is no more lossy, in principle, than an ordinary optical fiber connector bulkhead. The losses of such bulkheads are generally in the order of 1 to 2 dB.

In order to keep the cost of the arrangement of FIG. 7 or 8 low, it is desirable not to require too much processing in each fault-detection/optical fiber coupling. If the remote network is a complex network with extensive syntax requirements, the cost of each fault-detection/optical fiber coupling may grow. It would be advantageous to reduce the need for complex processing in each individual fault-detection/optical fiber coupling.

FIG. 9a is a simplified partial perspective or isometric view, partially exploded to show details, of a patch panel arrangement 900 according to an aspect of the invention. In FIG. 9a, A designates a patch panel with a printed-circuit board (PCB) designated M on the reverse side, which can be seen in FIG. 9b. A plurality of identical (except for the ID chip, not illustrated) inline fault detector/optical fiber couplings are illustrated, one of which is designated C. A plurality of LEDs arranged for inline fault detection are illustrated, one of which is designated B, and each of which is associated with a fault detector coupling C. Designation D represents a local network cable corresponding to 716 of FIG. 7, extending from the associated inline fault detector/ coupling through patch panel A to the remote side thereof, where the cable D is connected to conductive traces (not illustrated) on the PC board. The conductive traces on the pc board lead to an electronics module designated H, which multiplexes and converts the digital signal from each individual fault-detection/optical fiber coupling. More particularly, module H multiplexes the signals from each fault-detection/optical fiber coupling, so that they do not interfere, and also converts the syntax from a simple one associated with the individual fault-detection/optical fiber coupling to a more complex one associated with the remote network, accessible by way of path I. Path I also provides for power to the patch panel.

In FIG. 9a, F represents a first optical fiber cable, and E represents a connector therefore, such as a ferrule. Items K and L in FIG. 9a also represent an optical fiber cable and connector therefor. Item J represents an electrical connector corresponding to 714 of FIG. 7, but on the opposite side of cable 716. Item J plugs into the printed circuit board mounted on panel A.

As mentioned, the invention can be used in optical fiber coupling situations where an unthreaded alignment sleeve is used, or with a threaded alignment sleeve, with a bulkhead-connectible alignment sleeve, and can also be used with a flanged adaptor having a fiber optic connector on one side and a coupling on the other side.

A sensor (500) according to an aspect of the invention, for use in conjunction with light flow through a junction or gap (408) between first (410a) and second (410b) optical fibers, comprises an alignment sleeve (430) including first (430a) and second (430b) ends. The first (430a) and second (430b) ends of the alignment sleeve (430) are dimensioned to accommodate ends of first (420a) and second (420b) optical fiber ferrules, respectively. The alignment sleeve (430), when assembled with the ferrules (420a, 420b), coaxially aligns the associated first (410a) and second (410b) optical fibers, respectively, to thereby facilitate the flow of light across a gap (408) between the first (410a) and second (410b) optical fibers. The sensor (500) includes an optical sensor (510) located adjacent the gap (408), for generating an electrical signal representative of light leaking from the gap (408). An indication arrangement (512, 514), which may be static, dynamic, or both, is responsive to the electrical signal for providing an indication of light flow through the gap (408).

In a particular embodiment of the invention, the indication arrangement (512, 514) comprises a visual indicator (514), which may be a light-emitting solid-state device. Alternatively, the indication arrangement (512, 514) may be a digital electrical network interface (712), or both. In the case of a digital electrical network interface (712), the indication means may include a serial data bus interface (824), which may be an I²C bus connection.

A system (900) according to another aspect of the invention is for monitoring light flow through plural junctions between pairs or sets of optical fibers (K, F). Each of the sets (K, F) of optical fibers includes first (K) and second (F) optical fibers. The system (900) comprises a plurality of sensors (500, C), each of which comprises (a) an alignment sleeve (430) including first and second ends, with the first and second ends of the alignment sleeve (430) being dimensioned to accommodate ends of first and second optical fiber ferrules. The alignment sleeve (430), when assembled with the ferrules, coaxially align the associated first (K) and second (F) optical fibers, respectively, of one of the plural sets of optical fibers, to thereby facilitate the flow of light across a gap (408) between the first (K) and second (F) optical fibers of the one (K<F) of the sets of optical fibers. The system also includes (b) an optical sensor (510) located adjacent the gap (408), for generating an electrical signal representative of light leaking from the gap (408), (c) an address generator (720) for generating a unique address for each of the sensors (500), (d) a bus connection arrangement (824, 828) responsive to the electrical signal and to the address, for generating a bus signal including information relating to the light flow through the gap (408) and identity of the sensor (500), and (e) a bus (712, 716, 830, H, I) coupled to the bus connection arrangement (824, 828) of each of the sensors (500) and to utilization means. In a particular embodiment of this aspect of the invention, the bus connection arrangement (824, 828) generates the bus signal according to a first bus protocol, and the system further includes protocol conversion means (H) coupled to the bus, for converting the first bus protocol to a second bus protocol.

What is claimed is:

1. A sensor for use in conjunction with light flow through a junction between first and second optical fibers, said sensor comprising:

an alignment sleeve including first and second ends, said first and second ends of said alignment sleeve being dimensioned to accommodate ends of first and second optical fiber ferrules, said alignment sleeve, when assembled with said ferrules, coaxially aligning the associated first and second optical fibers, respectively, to thereby facilitate the flow of light across a gap between said first and second optical fibers;

an optical sensor located adjacent said gap, for generating an electrical signal representative of light leaking from said gap; and indication means responsive to said electrical signal for providing an indication of light flow through said gap.

2. A sensor for use in conjunction with light flow through a junction between first and second optical-signal-carrying optical fiber assemblies, said sensor comprising:

an alignment sleeve defining first and second ends, said first and second ends of said alignment sleeve being dimensioned to removably accommodate ends of said first and second optical-signal-carrying optical fiber assemblies, respectively, said alignment sleeve, when assembled with said ferrules, coaxially aligning the associated first and second optical-signal-carrying optical fiber assemblies with a gap therebetween, to thereby facilitate the flow of said optical signal through said gap and said first and second optical-signal-carrying optical fiber assemblies;

an optical sensor mounted on said sleeve and located adjacent said gap, for generating an electrical signal representative of optical signal leaking from said gap as a result of flow of said optical signal through said first optical-signal-carrying optical fiber assembly, said gap, and said second optical-signal-carrying optical fiber assembly; and indication means mounted on said sleeve and responsive to said electrical signal for providing an indication of said optical signal flow through said gap.

3. A sensing optical fiber connection arrangement according to claim 2, wherein said indication means comprises a visual indicator.

4. A sensing optical fiber connection arrangement according to claim 3, wherein said visual indicator is a light-emitting solid-state device.

5. A sensing optical fiber connection arrangement according to claim 4, wherein said light-emitting solid-state device includes a light-emitting diode.

6. A sensing optical fiber connection arrangement according to claim 2, wherein said indication means comprises a digital electrical network interface.

7. A sensing optical fiber connection arrangement according to claim 2, wherein said indication means comprises a serial data bus interface.

8. A sensing optical fiber connection arrangement according to claim 7, wherein said serial data bus interface is to an I²C bus connection.

9. A sensing optical fiber connection arrangement according to claim 2, wherein said alignment sleeve is part of a bulkhead connector.

10. A system for monitoring light flow through sets of optical fibers, each of said sets of optical fibers including first and second optical fibers with a junction therebetween, said system comprising a plurality of sensors, each of said sensors comprising:

an alignment sleeve including first and second ends, said first and second ends of said alignment sleeve being dimensioned to accommodate ends of first and second optical fiber ferrules of a set of said optical fibers, said alignment sleeve, when assembled with said ferrules, coaxially aligning the associated first and second optical fibers, respectively, of one of said plural sets of optical fibers, to thereby facilitate the flow of light through said first and second optical fibers, and across a gap between said first and second optical fibers of said one of said sets of optical fibers, which flow of light across said gap results in leakage of some of the light of said flow of light;

an optical sensor located adjacent said gap, for generating an electrical signal representative of the light leaking from said gap;

an address generator for generating a unique address for each of said sensors; and network bus connection means responsive to said electrical signal and to said address, for generating a network bus signal including information relating to the light flow through said gap and the identity of said sensor.

11. A system according to claim 10, further comprising a bus coupled to said bus connection means of each of said sensors and to utilization means.

12. A system according to claim 11, wherein said bus connection means generates said network bus signal according to a first bus protocol; and further comprising protocol conversion means coupled to said bus, for converting said first bus protocol to a second bus protocol.

13. A sensing optical fiber connection arrangement for use with first and second optical-signal-carrying optical fiber assemblies, where each of said optical-signal-carrying optical fiber assemblies has an end, which end is permanently fitted with a ferrule having predetermined dimensions, said connection arrangement comprising:

an alignment sleeve including first and second ends, said first and second ends of said alignment sleeve being dimensioned to removably accommodate said first and second optical fiber ferrules, respectively, for, when said first and second permanently affixed optical fiber ferrules are accommodated within said sleeve, coaxially aligning said ends of said first and second optical-signal-carrying optical fibers, and holding said ends of said first and second optical-signal-carrying optical fibers separated by a predetermined gap;

an optical sensor located adjacent said gap, for generating an electrical signal representative of optical signal leaking from said gap; and indication means responsive to said electrical signal for providing an indication of optical signal flow through said gap.

14. A sensing optical fiber connection arrangement according to claim 13, wherein said optical sensor is physically mounted on said alignment sleeve.

15. A sensing optical fiber connection arrangement according to claim 14, wherein said alignment sleeve defines an aperture extending at least partially therethrough at a location adjacent said gap; and said optical sensor is mounted within said aperture.

16. A sensing optical fiber connection arrangement according to claim 13, wherein said indication means is mounted on said alignment sleeve.

17. An indicating optical-signal-carrying optical fiber connection array for use with a plurality of optical-signal-carrying optical fiber assemblies, where each of said optical-signal-carrying optical fiber assemblies has an end, which end is permanently fitted with a ferrule having predetermined dimensions, said connection arrangement comprising:

a spatial array of a plurality of alignment sleeves, each of said alignment sleeves including first and second ends, said first and second ends of each of said alignment sleeves being dimensioned to removably accommodate said first and second optical fiber ferrules, respectively, of a selected pair of said optical-signal-carrying optical fiber assemblies for, when said first and second optical fiber ferrules of said selected pair of optical-signal-carrying optical fiber assemblies are accommodated within said sleeve, coaxially aligning said ends of said first and second optical-signal-carrying optical fibers of said selected pair of optical-signal-carrying optical fiber assemblies, and holding said ends of said first and second optical-signal-carrying optical fibers of said selected pair of optical-signal-carrying optical fiber assemblies separated by a predetermined gap;

an optical sensor mounted on each of said alignment sleeves at a location adjacent said gap, for generating an electrical signal representative of optical signal leaking from said gap; and indication means mounted on each of said alignment sleeves, each of said indication means being responsive to said electrical signal from the associated one of said optical sensors for providing an indication of optical signal flow through the associated one of said gaps.

18. An indicating optical-signal-carrying optical fiber connection array according to claim 17, wherein said indication means comprises a digital electrical network interface.

19. An indicating optical-signal-carrying optical fiber connection array according to claim 18, wherein said indication means comprises a serial data bus interface.

20. An indicating optical-signal-carrying optical fiber connection array according to claim 19, wherein said serial data bus interface is to an $I^2C$ bus connection.

21. An indicating optical-signal-carrying optical fiber connection array according to claim 17, wherein said alignment sleeve is part of a bulkhead connector.

22. An indicating optical-signal-carrying optical fiber connection array according to claim 21, wherein said bulkhead connector is mounted on a plate.

23. An indicating optical-signal-carrying optical fiber connection array according to claim 22, wherein said plate is a bulkhead.

* * * * *